(12) United States Patent
Weintz et al.

(10) Patent No.: US 7,151,133 B2
(45) Date of Patent: *Dec. 19, 2006

(54) COLOR AND/OR EFFECT-BEARING POWDER SLURRY, METHOD FOR PRODUCING THE SAME AND USE THEREOF

(75) Inventors: Hans-Joachim Weintz, Senden (DE); Dieter Weber, Overrath (DE)

(73) Assignee: BASF Coatings AG, Munster (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/432,759

(22) PCT Filed: Nov. 30, 2001

(86) PCT No.: PCT/EP01/14018

§ 371 (c)(1),
(2), (4) Date: May 28, 2003

(87) PCT Pub. No.: WO02/46320

PCT Pub. Date: Jun. 13, 2002

(65) Prior Publication Data

US 2004/0045480 A1    Mar. 11, 2004

(30) Foreign Application Priority Data

Dec. 7, 2000    (DE) .................... 100 60 765

(51) Int. Cl.
*C09D 5/02*    (2006.01)
*C09D 7/14*    (2006.01)

(52) U.S. Cl. .................... 524/590; 524/591

(58) Field of Classification Search ........ 106/403–404, 106/499; 428/402–403; 524/590, 591
See application file for complete search history.

(56) References Cited

U.S. PATENT DOCUMENTS

| 2,963,380 | A | * | 12/1960 | Leipen ........................ 106/311 |
| 4,365,043 | A |   | 12/1982 | Konishi et al. ............. 525/113 |
| 4,880,867 | A | * | 11/1989 | Gobel et al. ................ 524/507 |
| 5,379,947 | A |   | 1/1995  | Williams et al. .............. 241/21 |
| 5,609,203 | A |   | 3/1997  | Kinugasa et al. ........... 165/153 |
| 5,840,799 | A |   | 11/1998 | Mayer et al. ............... 524/507 |
| 5,981,653 | A |   | 11/1999 | Wilmes et al. .............. 524/839 |
| 6,177,487 | B1 |  | 1/2001  | Sapper et al. ............... 523/333 |
| 6,291,579 | B1 |  | 9/2001  | Kalck et al. ................ 524/832 |
| 6,344,501 | B1 |  | 2/2002  | Sierakowski et al. ....... 523/410 |
| 6,360,974 | B1 | * | 3/2002 | Sacharski et al. ............. 241/16 |
| 6,448,326 | B1 |  | 9/2002  | Mayer et al. ............... 524/507 |
| 6,512,026 | B1 |  | 1/2003  | Ott et al. .................... 523/409 |

FOREIGN PATENT DOCUMENTS

JP    53-109540    9/1978
JP    02-014776    1/1990

OTHER PUBLICATIONS

English Language Abstract for JP 02-014776, Jan. 18, 1990.
English Language Abstract for DE19618657.
English Language Abstract for EP 614 951.
Derwent Accession No. 21978-78800A, English Abstract for JP 53-109540, Sep. 25, 1978.

* cited by examiner

Primary Examiner—C. Melissa Koslow

(57) ABSTRACT

A color and/or effect powder slurry (A), preparable by mixing a non-(A) color and/or effect powder slurry (B) or a clearcoat powder slurry (B) with at least one tinting paste (C) and correctable subsequently in terms of its shade and/or in terms of its optical effects using at least one tinting paste (C).

7 Claims, No Drawings

COLOR AND/OR EFFECT-BEARING POWDER SLURRY, METHOD FOR PRODUCING THE SAME AND USE THEREOF

The present invention relates to novel color and/or effect powder slurries. The present invention further relates to a novel process for preparing color and/or effect powder slurries. The present invention additionally relates to a novel process for the subsequent tinting of color and/or effect powder slurries. The present invention relates not least to a novel mixer system and modular system for color and/or effect powder slurries.

Color and/or effect powder slurries, i.e., aqueous dispersions of color and/or effect powder coating materials, have been known for a long time.

For instance, the Japanese patent application JP 53 109 540 A1 (Derwent Abstract 78800A/44) discloses a color and/or effect powder slurry, of which no further details are given, for the production of a color and/or effect basecoat.

The German laid-open specification DE 27 10 421 A1 discloses a powder slurry which comprises metal-effect pigments and is based on amine-neutralized acrylate copolymers and melamine resins or on polyesters and epoxy resins. The known powder slurry produces smooth, glossy, metallic coatings.

The Japanese patent application JP 02 014 776 A2 discloses a multicoat system, comprising basecoat and clearcoat, whose basecoat is produced from a color and/or effect powder slurry based on hydroxyl-containing acrylate copolymers and blocked polyisocyanates.

The American patent U.S. Pat. No. 5,379,947 A discloses cosolvent-free, color and/or effect powder slurries based, for example, on hydroxyl-containing acrylate copolymers and blocked polyisocyanates or glycidyl-containing acrylate copolymers and long-chain alkanedioic acids. The color and/or effect powder slurries may be used either to produce primers, i.e., primer-surfacer coats or antistonechip primer coats, or to produce basecoats.

Like the corresponding powder coating materials, color and/or effect powder slurries have the advantage over the conventional or aqueous, wet color and/or effect coating materials of complete or near-complete freedom from organic solvents. Relative to the powder coating materials, they possess the substantial advantage that they may be stored; transported and applied in the same way as the wet coating materials and, unlike powder coating materials, require no special equipment.

Following application and the evaporation of the water, they are present like the powder coating materials in a thin layer on the substrate and are melted to form a continuous powder coating film. Curing takes place during or after the melting of the powder layer. The minimum temperature for curing is preferably above, the melting range of the powder, so that melting and curing are separate from one another. This has the advantage that, owing to its comparatively low viscosity, the powder melt flows out well before curing sets in.

The prior art color and/or effect powder slurries and the processes for preparing them have a substantial disadvantage which hinders their widespread use in spite of the technical advantages they possess.

Thus adjusting and/or correcting the shade by way of mixing or tinting steps is not possible; instead, the shade is determined solely by the original components weighed in. This means that the color and/or effect pigments must pass through the entire preparation process, or part of it, which may lead to damage to the pigments. Or else the pigments are mixed into a powder slurry clearcoat material, thereby frequently giving rise to problems with the dispersion of the color and/or effect pigments in the powder slurry.

Whether the finished color and/or effect powder slurry and the coating produced from it ultimately also has the desired shade and/or optical effect is then dependent on numerous different process parameters and on the particular implementation of the preparation processes, so that it becomes extremely difficult to determine the cause of off-specification batches. It is obvious that the powder slurries whose composition and whose performance properties profile differ from the preset specifications, especially as regards the shades and/or the optical effects, are unable to provide coatings which meet the specification.

Moreover, the existing preparation processes are uneconomic, since it is necessary to prepare a color and/or effect powder slurry of one particular shade and/or optical effect in a comparatively large amount, even if only small amounts of it are required.

Mixer systems for aqueous coating materials (wet coating materials) are known from the patent applications DE 41 10 520 A1, EP 0 471 972 A1, EP 0 578 645 A1, EP 0 614 951 A1 or EP 0 698 773 A1.

They permit the preparation as required of aqueous coating materials in precisely matchable shades and optical effects. These known mixer systems comprise substantially water-free color and/or effect base colors and at least one aqueous, pigment-free mixing varnish. These mixer systems and the coating materials prepared from them, on the basis of their variability, substantially meet the continually increasing requirements of the market. In the form of modular systems, therefore, these known mixer systems have been able to establish themselves, especially in automotive refinishing, where they are used to prepare small amounts of color and/or effect coating materials. In order to make effective use of the potential of these modular systems, the material compositions of the color and/or effect coating materials are determined with the aid of a paint mixing formula system.

To date, however, color and/or effect powder slurries have not been used in the context of such modular systems.

In the context of the present invention, the term "module" refers to a standardized, ready-to-use, commercial product whose performance properties profile is adapted precisely to the properties profiles of the other modules and supplements them, so that the modules overall may be combined to give a modular system.

It is an object of the present invention to provide novel color and/or effect powder slurries which no longer have the disadvantages of the prior art but whose composition and technical properties profile, especially as regards the shades and/or the optical effects, correspond precisely to the particular preset specifications. The intention is that the color and/or effect potential of the pigments should be fully utilized in the coatings produced from the novel powder slurries. Furthermore, the novel powder slurries should be simple to prepare.

A further object of the present invention was to find a novel process for preparing color and/or effect powder slurries which no longer has the disadvantages of the prior art but which instead makes it possible, without great complexity, to prepare powder slurries with different shades and/or optical effects, the color and/or effect powder slurries always meeting fully the preset specifications. Moreover, it is intended that the novel process should make it possible to carry out subsequent adjustment, to specification, of color and/or effect powder slurries which have already been prepared but which deviate from the preset specifications, so that few if any off-specification batches occur.

A further object of the present invention was to find a novel mixer system for powder slurries which permits not only the preparation of color and/or effect powder slurries but also the subsequent adjustment of their shades and/or their optical effects.

An object of the present invention was not least to find a novel modular system for color and/or effect powder slurries which permits the preparation of color and/or effect powder slurries and also the subsequent adjustment of their shades and/or their optical effects on the basis of a paint mixing formula system.

Accordingly, we have found the novel color and/or effect powder slurry (A) which is preparable by mixing a non-(A) color and/or effect powder slurry (B) or a clearcoat powder slurry (B) with at least one tinting paste (C), and which is referred to below as the "powder slurry (A) of the invention".

We have also found the novel process for preparing the powder slurry (A) of the invention, which involves mixing a non-(A) color and/or effect powder slurry (B) or a clearcoat powder slurry (B) with at least one tinting paste (C), to give the powder slurry (A) of the invention.

In the text below, the novel process for preparing the powder slurry. (A) of the invention is referred to as the "preparation process of the invention".

Furthermore, we have found the novel mixer system for preparing or subsequently correcting the shade and/or the optical effects of the powder slurry (A) of the invention, said system comprising (I) at least one color and/or effect powder slurry (B) and/or at least one clearcoat powder slurry (B),
(II) at least two different-colored tinting pastes compatible with the powder slurry (B) and with one another, and
(III) a paint mixing formula system, and being referred to below as the "mixer system of the invention".

Further subject matter of the invention will emerge from the description.

The powder slurry (A) of the invention is preparable by mixing a non-(A) color and/or effect powder slurry (B) or a clearcoat powder slurry (B) with at least one tinting paste (C).

It is a particular advantage of the powder slurry (A) of the invention and of the preparation process of the invention that by means of the tinting paste (C) it is possible to carry out subsequent correction to the shade and/or optical properties of the powder slurry (A) of the invention. Accordingly, the preparation process of the invention may also be implemented as a tinting process of the invention.

The optical effects in question comprise, in particular, metallic effects and/or dichroic optical effects (cf. Römpp Lexikon Lacke and Druckfarben, Georg Thieme Verlag, 1998, page 176, "Effect pigments" and pages 380 and 381, "metal oxide-mica pigments" to "metal pigments").

The powder slurry (A) of the invention and the color and/or effect powder slurry (B) or the clearcoat powder slurry (B), which constitute the precursor of the powder slurry (A) of the invention, are curable thermally and/or with actinic radiation. After curing, they form three-dimensionally crosslinked, thermoset coatings.

Where they are thermally curable, they may be thermally externally crosslinking or self-crosslinking, especially externally crosslinking. In the context of the present invention, the term "self-crosslinking" refers to the property of a binder whereby it enters into crosslinking reactions with itself. A prerequisite for this is that the binders already contain both kinds of complementary reactive functional groups which are necessary for crosslinking, or reactive functional groups which are able to react "with themselves". Externally crosslinking, on the other hand, is the term used to refer to those powder slurries of the invention in which one kind of the complementary reactive functional groups is present in the binder and the other kind in a curing or crosslinking agent. For further details of this, reference is made to Römpp, op. cit., "Curing", pages 274 to 276, especially page 275, bottom.

In the context of the present invention, actinic radiation is electromagnetic radiation such as near infrared, visible light, UV radiation or X-rays, especially UV radiation, or corpuscular radiation such as electron beams.

Where thermal curing and actinic radiation curing are employed simultaneously, the terms dualcure and dual-cure powder slurries are also used.

The powder slurry (A) of the invention, the color and/or effect powder slurry (B) and the clearcoat powder slurry (B) may alternatively be thermoplastic and noncrosslinking. In other words, curing in this case takes place physically by coalescence of the melted powder slurry particles and interlooping of the polymer molecules.

In accordance with the invention, the systems curable thermally and/or with actinic radiation are of advantage and are therefore employed with particular preference.

The preparation of the powder slurry (A) of the invention by the preparation process of the invention starts from the color and/or effect powder slurry (B) or the clearcoat powder slurry (B). The tinting( process of the invention is directed to the powder slurry (A) of the invention.

The boundaries between the preparation process of the invention and the tinting process of the invention are of course fluid. The skilled worker will regard the preparation process as being the process wherein the starting product, the powder slurry, experiences a significant change in its material composition through the addition of the tinting pastes. The skilled worker will regard the tinting process, on the other hand, as being the process wherein the starting product experiences only a slight change in its material composition through the addition of the tinting pastes, since the very purpose of tinting processes is to carry out subsequent correction to the shades and/or optical effects of the product using as little tinting paste as possible, so as not to cause changes in other, valuable properties of the powder slurry.

The powder slurry (A) of the invention, the color and/or effect powder slurry (B) and the clearcoat powder slurry (B) comprise at least one finely divided dimensionally stable constituent, i.e., a powder coating material, as the disperse phase and an aqueous medium as the continuous phase.

The finely divided, dimensionally stable constituent or powder coating material of the powder slurry (A) of the invention, of the color and/or effect powder slurry (B) and of the clearcoat powder slurry (B) may be solid and/or of high viscosity. In the context of the present invention, "of high viscosity" means that, under the customary and known conditions of the preparation, storage and application of powder slurries, the particles behave substantially like solid particles. Preferably, the powder coating material is solid.

The individual particles of the finely divided constituent are also dimensionally stable. In the context of the present invention, "dimensionally stable" means that, under the customary and known conditions of the storage and application of powder slurries, the particles undergo little if any agglomeration and/or breakdown into smaller particles, but instead substantially retain their original form even under the influence of shear forces.

The solids content of the powder slurry (A) of the invention, of the color and/or effect powder slurry (B) or of the clearcoat powder slurry (B) is preferably from 10 to 80, more preferably from 15 to 75, with particular preference from 20 to 70, with very particular preference from 25 to 70, and in particular from 30 to 65% by weight, based in each case on the powder slurry (A) or (B).

The average particle size of the finely divided, dimensionally stable constituents of the powder slurry (A) of the invention, of the color and/or effect powder slurry (B) and of the clearcoat powder slurry (B) is preferably from 0.8 to 40 µm, more preferably from 0.8 to 20 µm, and with particular preference from 2 to 6 µm. By average particle size is meant the 50% median determined by the laser diffraction method, i.e., 50% of the particles have a diameter $\leq$ the median and 50% of the particles have a diameter $\geq$ the median.

The particle size finds its upper limit when the particles, owing to their size, are no longer able to flow out fully on baking and, consequently, the film leveling is adversely affected. An upper limit of 40 µm is considered sensible, since, above this particle size, blocking of the rinsing ducts of the highly sensitive application apparatus may be expected.

The powder slurry (A) of the invention, the color and/or effect powder slurry (B) and the clearcoat powder slurry (B) are preferably free from organic solvents (cosolvents). In the context of the present invention this means that they have a residual volatile solvent content of <1% by weight, preferably <0.5% by weight, and with particular preference <0.2% by weight. It is of very particular advantage in accordance with the invention if the residual content lies below the gas-chromatographic detection limit.

In a first embodiment which is preferred in accordance with the invention, the finely divided, dimensionally stable constituent of the powder slurry (A) of the invention and of the color and/or effect powder slurry (B) comprises at least one color and/or effect pigment; i.e., the totality of the pigments used is present in the dispersed powder coating particles.

In a second embodiment which is preferred in accordance with the invention, powder slurry (A) of the invention and the color and/or effect powder slurry (B) comprise at least one pigment-free finely divided constituent or powder coating material and at least one powderous color and/or effect pigment; i.e., all pigments are present as a separate solid phase. Regarding their particle size, the comments made above apply mutatis mutandis.

In a third embodiment which is preferred in accordance with the invention, the powder slurry (A) of the invention and the color and/or effect powder slurry (B) comprise at least one dispersed powder coating material which comprises one portion of the pigments used while the other portion of the pigments is present in a separate solid phase. In this case, the fraction present in the powder coating particles may comprise the majority, i.e., more than 50%, of the pigments used. Alternatively, less than 50% may be present in the powder coating particles. Regarding the particle sizes, the comments made above apply here as well, mutatis mutandis.

The particular variant of the powder slurry (A) of the invention or of the color and/or effect powder slurry (B) to which preference is given depends in particular on the nature of the pigments and/or on the process by which the particular color and/or effect powder slurry used is prepared. In the majority of cases, the first preferred embodiment affords particular advantages and so is particularly preferred in accordance with the invention.

The pigments may comprise organic or inorganic compounds. Owing to this large number of suitable pigments, therefore, the powder slurry (A), of the invention and the color and/or effect powder slurry (B) ensure a universal breadth of use and make it possible to realise a large number of shades and optical effects.

Examples of suitable effect pigments are metal flake pigments such as commercially customary aluminum bronzes, aluminum bronzes chromated in accordance with DE 36 36 183 A1, and commercially customary stainless steel bronzes, and also nonmetallic effect pigments, such as pearlescent pigments and interference pigments, for example, platelet-shaped effect pigments based on iron oxide, which has a shade ranging from pink to brownish red, liquid-crystalline effect pigments or fluorescent pigments (daylight fluorescent pigments) such as bis (azomethine) pigments. For further details, reference is made to Römpp, op. cit., page 176, "Effect pigments" and pages 380 and 381, "metal oxide-mica pigments" to "metal pigments", and, to the patent applications and patents DE 36 36 156 A1, DE 37 18 446 A1, DE 37 19 804 A1, DE 39 30 601 A1, EP 0 068 311 A1, EP 0 264 843 A1, EP 0 265 820 A1, EP 0 283 852 A1, EP 0 293 746 A1, EP 0 417 567 A1, U.S. Pat. Nos. 4,828,826 A or 5,244,649 A.

Examples of suitable inorganic color pigments are white pigments such as titanium dioxide, zinc white, zinc sulfide or lithopones; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chrome orange; or yellow iron oxide, nickel titanium yellow, chrome titanium yellow, cadmium sulfide, cadmium zinc sulfide, chrome yellow or bismuth vanadate.

Examples of suitable organic color pigments are monoazo pigments, disazo pigments, anthraquinone pigments, benzimidazole pigments, quinacridone pigments, quinophthalone pigments, diketopyrrolopyrrol pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

For further details, reference is made to Römpp, op. cit., pages 180 and 181, "iron blue pigments" to "black. iron oxide", pages 451to 453, "pigments" to "pigment volume concentration", page 563, "thioindigo pigments", page 567; "titanium dioxide pigments", pages 400 and 467, "naturally occurring pigments", page 459 "polycyclic pigments", page 52, "azomethine pigments", "azo pigments", and page 379, "metal complex pigments".

In accordance with the invention it is of advantage if the color and/or effect powder slurry (B) contains only color pigments. Further advantages result if the color powder slurry (B) has a light shade, in particular an achromatic shade. Achromatic colors differ from the chromatics in that they lack chroma and hue; they exhibit only lightness. The achromatic colors include black and white and also the gray shades which lie between them or can be mixed from them (cf. Römpp, op. cit., "Achromatic point", page 590). Particular preference is given to the use of a white powder slurry (B).

Furthermore, the color and/or effect powder slurry (B) and the powder slurry (A) of the invention may also comprise electrically conductive pigments, magnetically shielding pigments, and/or metal powders.

Examples of suitable electrically conductive pigments are titanium dioxide/tin oxide pigments.

Examples of magnetically shielding pigments are pigments based on iron oxides or chromium dioxide.

Examples of suitable metal powders are powders comprising metals and metal alloys, such as aluminum, zinc, copper, bronze or brass.

The powder slurry (A) of the invention and the color and/or effect powder slurry (B) may further comprise organic and inorganic fillers, which like the pigments may be present within and without the dispersed powder coating particles; the comments made regarding the pigments apply here, mutatis mutandis.

Examples of suitable organic and inorganic fillers are chalk, calcium sulfates, barium sulfate, silicates such as talc or kaolin, silicas, oxides such as aluminum hydroxide or magnesium hydroxide, or organic fillers such as polyacrylonitrile powder or polyamide powder. For further details, reference is made to Römpp, op. cit., pages 250 ff., "Fillers". Further examples of suitable fillers are known from the German patent application DE 196 06 706 A1, column 8 lines 30 to 64. They are preferably used in the amounts specified therein.

The pigments and fillers may also be present in ultrafine, nonhiding form.

The amount of the pigments, including the fillers, in the powder slurry (A) of the invention and in the color and/or effect powder slurry (B) may vary very widely and is guided by the requirements of the individual case, in particular by the optical effect to be established and/or the hiding power of the pigments that are used in each case. The pigment content is preferably from 0.5 to 80, more preferably from 0.8 to 75, with particular preference from 1.0 to 70, with very particular preference from 1.2 to 65, and in particular from 1.3 to 60% by weight, based in each case on the solids of the powder slurry (A) or (B).

In addition to the pigments described above, the powder slurry (A) of the invention and the color and/or effect powder slurry (B) may comprise organic dyes in molecularly disperse distribution.

These molecularly dispersely distributed dyes may be present either in the dispersed powder coating particles or in the continuous phase of the powder slurry (A) of the invention or of the color and/or effect powder slurry (B).

However, they may also be present in the dispersed powder coating particles and in the continuous phase. In this case, the fraction present in the powder coating particles may comprise the majority, i.e., more than 50%, of the organic dyes used. It is also possible for less than 50% to be present in the powder coating particles. The distribution of the organic dyes between the phases may correspond to the thermodynamic equilibrium which results from the solubility of the organic dyes in the phases. However, the distribution may also be at a far remove from the thermodynamic equilibrium.

Suitable organic dyes are all those which are soluble, in the sense set out above, in the powder slurry (A) of the invention and in the color and/or effect powder slurry (B). Lightfast organic dyes are highly suitable. Especially suitable lightfast organic dyes are those having little or no tendency to migrate from the coatings produced from the powder slurry (A) of the invention. The migration tendency can be estimated by the skilled worker on the basis of his or her general knowledge in the art and/or can be determined with the aid of simple preliminary rangefinding experiments—in the context of tinting tests, for example.

The amount of the molecularly dispersely distributed organic dyes in the powder slurry (A) of the invention and in the color and/or effect powder slurry (B) may vary extremely widely and is guided primarily by the color and the chroma to be established and by the amount of pigments and/or fillers present.

The powder slurry (A) of the invention, the color and/or effect powder slurry (B) and the clearcoat powder slurry (B) comprise as essential constituent at least one binder.

The binders are oligomeric and polymeric resins. Oligomers are resins containing at least 2 to 15 monomer units in their molecule. In the context of the present invention, polymers are resins which contain at least 10 repeating monomer units in their molecule. For further details of these terms, reference is made to Römpp, op. cit., "Oligomers", page 425.

It is of advantage in accordance with the invention if the minimum. film formation temperature of the binders is at least 10° C., preferably at least 20, with particular preference at least 25, with very particular preference at least 30, and in particular at least 35° C. The minimum film formation temperature may be determined by drawing down the aqueous binder dispersion onto a glass plate using a coating bar and heating the drawdown in a gradient oven. The temperature at which the powderous layer films is referred to as the minimum film formation temperature. For further details, reference is made to Römpp, op. cit., "Minimum film formation temperature", page 391.

Examples of suitable binders are random, alternating and/or block, linear and/or branched and/or comb addition (co)polymers of ethylenically unsaturated monomers, polyaddition resins and/or polycondensation resins. For further details of these terms, reference is made to Römpp, op. cit., page 457, "Polyaddition" and "Polyaddition resins (polyadducts)", pages 463 and 464, "Polycondensates", "Polycondensation" and "Polycondensation resins", and pages 73 and 74, "Binders".

Examples of suitable addition (co)polymers are (meth) acrylate (co)polymers or partially saponified polyvinyl esters, especially (meth)acrylate copolymers.

Examples of suitable polyaddition resins and/or polycondensation resins are polyesters, alkyds, polyurethanes, polylactones, polycarbonates, polyethers, epoxy resins, epoxy resin-amine adducts, polyureas, polyamides, polyimides, polyester-polurethanes polyether-polyurethanes or polyester-polyether-polyurethanes, especially epoxy resins.

The self-crosslinking binders of the thermally curable powder slurries (A) and (B) and of the dual-cure powder slurries (A) and (B) contain reactive functional groups which are able to enter into crosslinking reactions with groups of their kind or with complementary reactive functional groups. The externally crosslinking binders contain reactive functional groups which are able to enter into crosslinking reactions with complementary reactive functional groups that are present in crosslinking agents. Examples of suitable complementary reactive functional groups used in accordance with the invention are compiled in the overview below. In the overview, the variable R stands for, an acyclic or cyclic aliphatic radical, an aromatic radical and/or an aromatic-aliphatic (araliphatic) radical; the variables R' and R" stand for identical or different aliphatic radicals or are linked with one another to form an aliphatic or heteroaliphatic ring.

Overview: EXAMPLES OF COMPLEMENTARY FUNCTIONAL GROUPS

| Binder and<br><br>Crosslinking<br>agent and | Crosslinking<br>agent<br>or<br><br>Binder |
|---|---|
| —SH<br>—NH$_2$<br>—OH<br>—O—(CO)—NH—(CO)—NH$_2$<br>—O—(CO)—NH$_2$<br>>NH | —C(O)—OH<br>—C(O)—O—C(O)—<br>—NCO<br>—NH—C(O)—OR<br>—CH$_2$—OH<br>—CH$_2$—O—R<br>—NH—CH$_2$—O—R<br>—NH—CH$_2$—OH<br>—N(—CH$_2$—O—R)$_2$<br>—NH—C(O)—CH(—C(O)OR)$_2$<br>—NH—C(O)—CH(—C(O)OR)(—C(O)—R)<br>—NH—C(O)—NR'R"<br>>Si(OR)$_2$<br><br>$\overset{O}{\underset{\displaystyle CH - CH_2}{\triangle}}$<br><br>$\overset{\overset{O}{\parallel}}{\underset{\displaystyle O \diagup \; \diagdown O}{C}}$<br>$\phantom{xxx}\underset{\displaystyle CH - CH_2}{}$ |
| —C(O)—OH | $\overset{O}{\underset{\displaystyle CH - CH_2}{\triangle}}$<br><br>—C(O)—N(CH$_2$—CH$_2$—OH)$_2$ |

The selection of the respective complementary groups is guided firstly by the consideration that, during the preparation, storage, application and melting of the powder slurry (A) of the invention, they should not enter into any unwanted reactions, in particular no premature crosslinking, and/or, if appropriate, should not disrupt or inhibit the curing with actinic radiation, and secondly by the temperature range within which crosslinking is to take place.

In the case of the powder slurry (A) of the invention, it is preferred to employ crosslinking temperatures of from 60 to 180° C. Use is therefore made preferably of binders containing thio, hydroxyl, N-methylolamino, N-alkoxymethylamino, imino, carbamate, allophanate, epoxy or carboxyl groups, preferably hydroxyl or epoxy groups, in particular epoxy groups, on the one hand, and preferably of crosslinking agents containing anhydride, carboxyl, epoxy, blocked isocyanate, urethane, methylol, methylol ether, siloxane, carbonate, amino, hydroxyl and/or beta-hydroxyalkylamide groups, preferably epoxy, hydroxyl, beta-hydroxyalkylamide, blocked and unblocked isocyanate, urethane or alkoxymethylamino groups, with particular preference epoxy or hydroxyl groups, especially phenolic hydroxyl groups, on the other.

In the case of self-crosslinking powder slurries (A) and (B), the binders contain, in particular, methylol, methylol ether and/or N-alkoxymethylamino groups.

Complementary reactive functional groups which are especially suitable for use in the powder slurry (A) of the invention, in the color and/or effect powder slurry (B) and. in the clearcoat powder slurry (B) are
  carboxyl groups on the one hand and epoxy groups and/or beta-hydroxyalkylamide groups on the other;
  hydroxyl groups on the one hand and blocked isocyanate, urethane or alkoxymethylamino groups on the other; and
  epoxy groups on the one hand and phenolic hydroxyl groups on the other.

The functionality of the binders in respect of the reactive functional groups described above may vary. very widely and is guided in particular by the target crosslinking density and/or by the functionality of the crosslinking agents that are employed in each case. In the case of carboxyl-containing binders, for example, the acid number is preferably from 10 to 100, more preferably from 15 to 80, with particular preference from 20 to 75, with very particular preference from 25 to 70, and in particular from 30 to 65 mg/KOH/g. Or, in the case of hydroxyl-containing binders, the OH number is preferably from 15 to 300, more preferably from 20 to 250, with particular preference from 25 to 200, with very particular preference from 30 to 150, and in particular from 35 to 120 mg/KOH/g. Or, in the case of binders containing epoxy groups, the epoxide equivalent weight is preferably from 400 to 2500, more preferably from 420 to 2200, with particular preference from 430 to 2100, with very particular preference from 440 to 2000, and in particular from 440 to 1900.

The complementary reactive functional groups described above may be incorporated into the binders in accordance with the customary and known methods of polymer chemistry. This can be done, for example, by incorporating monomers which carry the corresponding reactive functional groups, and/or with the aid of polymer-analogous reactions.

Examples of suitable olefinically unsaturated monomers containing reactive functional groups are (a1) monomers which carry per molecule at least one hydroxyl, amino, alkoxymethylamino, carbamate, allophanate or imino group, such as hydroxyalkyl esters of acrylic acid, methacrylic acid or another alpha, beta-olefinically unsaturated carboxylic acid which are derived from an alkylene glycol which is esterified with the acid, or which are obtainable by reacting the alpha, beta-olefinically unsaturated carboxylic acid with an alkylene oxide such as ethylene oxide or propylene oxide, especially hydroxyalkyl esters of acrylic acid, methacrylic acid, ethacrylic acid, crotonic acid, maleic acid, fumaric acid or itaconic acid in which the hydroxyalkyl group contains up to 20 carbon atoms, such as 2-hydroxyethyl, 2-hydroxypropyl, 3-hydro-xypropyl, 3-hydroxybutyl and 4-hydroxybutyl acrylate, methacrylate, ethacrylate, crotonate, maleate, fumarate or itaconate; or hydroxycycloalkyl esters such as 1,4-bis(hydroxymethyl)cyclohexane, octahydro-4,7-methano-1H-indenedimethanol or methyl-propanediol monoacrylate, monomethacrylate, monoethacrylate, monocrotonate, monomaleate, monofumarate or monoitaconate; reaction products of cyclic esters, such as epsilon-caprolactone, for example, and these hydroxyalkyl or hydroxycyloalkyl esters;

olefinically unsaturated alcohols such as allyl alcohol;

polyols such as trimethylolpropane monoallyl or diallyl ether or pentaerythritol monoallyl, diallyl or triallyl ether;

reaction products of acrylic acid and/or methacrylic acid with the glycidyl ester at an alpha-branched monocarboxylic acid having 5 to 18 carbon atoms per molecule, especially a Versatic® acid, or, instead of the reaction product, an equivalent amount of acrylic and/or methacrylic acid which is then reacted, during or after the polymerization reaction, with the glycidyl ester and an alpha-branched monocarboxylic acid having 5 to 18 carbon atoms per molecule, in particular a Versatic® acid;

aminoethyl acrylate, aminoethyl methacrylate, allylamine or N-methyliminoethyl acrylate;

N,N-Di(methoxymethyl)aminoethyl acrylate or methacrylate or N,N-di(butoxymethyl)aminopropyl acrylate or methacrylate;

(Meth)acrylamides such. as (meth)acrylamide, N-methyl-, N-methylol-, N,N-dimethylol-, N-methoxymethyl-, N,N-di (methoxymethyl) -, N-ethoxymethyl- and/or N,N-di(ethoxyethyl) -(meth)acrylamide;

Acryloyloxy- or methacryloyloxy-ethyl, -propyl or -butyl carbamate or allophanate; further examples of suitable monomers containing carbamate groups are described in the patents U.S. Pat. Nos. 3,479,328 A, 3,674,838 A, 4,126,747 A, 4,279,833 A or 4,340,497 A;

(a2) Monomers which carry per molecule at least one acid group, such as acrylic acid, methacrylic acid, ethacrylic acid, crotonic acid, maleic acid, fumaric acid or itaconic acid;

olefinically unsaturated sulfonic or phosphonic acids or their partial esters;

mono(meth)acryloyloxyethyl maleate, succinate or phthalate; or vinylbenzoic acid (all isomers) alpha-methylvinylbenzoic acid (all isomers) or vinylbenzenesulfonic acid (all isomers);

(a3) monomers containing epoxy groups, such as the glycidyl ester of acrylic acid, methacrylic acid, ethacrylic acid, crotonic acid, maleic acid, fumaric acid or itaconic acid, or allyl glycidyl ether.

They are used preferably to prepare the (meth)acrylate copolymers, especially the ones containing glycidyl groups.

Monomers of the type described above which are of relatively high functionality are generally used in minor amounts. In the context of the present invention, minor amounts of monomers of relatively high functionality are amounts which do not lead to crosslinking or gelling of the addition copolymers, especially the (meth)acrylate copolymers, unless the specific intention is to prepare crosslinked polymeric microparticles.

Examples of suitable monomer units for introducing reactive functional groups into polyesters or polyester-polyurethanes are 2,2-dimethylolethyl- or -propylamine which have been blocked with ketone, the resulting ketoxime group being hydrolyzed again following the incorporation; or compounds containing two hydroxyl groups or two primary and/or secondary amino groups and also at least one acid group, in particular at least one carboxyl group and/or at least one sulfonic acid group, such as dihydroxypropionic acid, dihydroxysuccinic acid, dihydroxybenzoic acid, 2,2-dimethylolacetic acid, 2,2-dimethylolpropionic acid, 2,2-dimethylolbutyric acid, 2,2-dimethylolpentanoic acid, α,δ-diaminovaleric acid, 3,4-diaminobenzoic acid, 2,4-diaminotoluenesulfonic acid or 2,4-diaminodiphenyl ether sulfonic acid.

One example of introducing reactive functional groups by way of polymer-analogous reactions is the reaction of hydroxyl-containing resins with phosgene, resulting in resins containing chloroformate groups, and the polymer-analogous reaction of the chloroformate-functional resins with ammonia and/or primary and/or secondary amines to give resins containing carbamate groups. Further examples of suitable methods of this type are known from the patents U.S. Pat. Nos. 4,758,632 A, 4,301,257 A or 2,979,514 A.

The binders of the dual-cure powder slurries (A) and (B) further comprise on average per molecule at least one, preferably at least two, group(s) having at least one bond which can be activated with actinic radiation. The binders of the color and/or effect powder slurries curable with actinic radiation contain at least two of these groups.

In the context of the present invention, a bond which can be activated with actinic radiation is a bond which on exposure to actinic radiation becomes reactive and, with other activated bonds of its kind, enters into polymerization reactions and/or crosslinking reactions which proceed in accordance with radical and/or ionic mechanisms. Examples of suitable bonds are carbon-hydrogen single bonds or carbon-carbon, carbon-oxygen, carbon-nitrogen, carbon-phosphorus or carbon-silicon single or double bonds. Of these, the carbon-carbon double bonds are particularly advantageous and are therefore used with very particular preference in accordance with the invention. For the sake of brevity, they are referred to below as "double bonds".

Accordingly, the group which is preferred in accordance with the invention contains one double bond or two, three or four double bonds. If more than one double bond is used, the double bonds may be conjugated. In accordance with the invention, however, it is of advantage if the double bonds are present in isolation, in particular each being present terminally, in the group in question. It is of particular advantage in accordance with the invention to use two double bonds or, in particular, one double bond.

Where on average per molecule more than one group which can be activated with actinic radiation is employed, the groups are structurally different from one another or are of the same structure.

Where they are structurally different from one another, this means in the context of the present invention that two, three, four or more, but especially two, groups which can be activated with actinic radiation are used that derive from two, three, four or more, but especially two, monomer classes.

Examples of suitable groups are (meth)acrylate, ethacrylate, crotonate, cinnamate, vinyl ether, vinyl ester, dicyclopentadienyl, norbornenyl, isoprenyl, isopropenyl, allyl or butenyl groups; dicyclopentadienyl ether, norbornenyl ether, isoprenyl ether, isopropenyl ether, allyl ether or butenyl ether groups; or dicyclopentadienyl ester, norbornenyl ester, isoprenyl ester, isopropenyl ester, allyl ester or butenyl ester groups, but especially acrylate groups.

Preferably, the groups are attached to the respective parent structures of the binders by way of urethane, urea, allophanate, ester, ether and/or amide groups, but especially by way of ester groups. Normally, this occurs as a result of customary and known polymer-analogous reactions such as, for instance, the reaction of lateral glycidyl groups with the above-described olefinically unsaturated monomers which contain an acid group, of lateral hydroxyl groups with the halides of these monomers, of hydroxyl groups with isocyanates containing double bonds, such as vinyl isocyanate, methacryloyl isocyanate and/or 1-(1-isocyanato-1-methylethyl)-3-(1-methylethenyl)benzene (TMI® from CYTEC), or of isocyanate groups with the above-described hydroxyl-containing monomers.

In the dual-cure powder slurries (A) and (B) it is also possible to employ mixtures of plainly thermally curable binders and binders curable plainly with actinic radiation.

Suitable binders include
all the binders envisaged for use in clearcoat powder slurries curable thermally and/or with actinic radiation, said binders being described in the American patents U.S. Pat. Nos. 4,268,542 A or 5,379,947 A and in the patent applications DE 27 10 421 A1, DE-195 40 977 A1, DE 195 18 392 A1, DE 196 17 086 A1, DE 196 13 547 A1, DE 196 18 657 A1, DE 196 52 813 A1, DE 196 17 086 A1, DE 198 14 471 A1, DE 198 41 842 A1 or DE 198 41 408 A1, in the German patent applications DE 199 08 018.6 or DE 199 08 013.5, unpublished at the priority date of the present specification, or in the European patent application EP 0 652 264 A1;
all the binders envisaged for use in dual-cure clearcoat materials and described in the patent applications DE 198 35 296 A1, DE 197 36 083 A1 or DE 198 41 842 A1; or
all the binders envisaged for use in thermally curable powder coating materials and described in the German patent application DE 42 22 194 A1, in the product information bulletin from BASF Lacke+ Farben AG, "Pulverlacke" [Powder coatings], 1990, in the BASF Coatings AG brochure "Pulverlacke, Pulverlacke für industrielle Anwendungen" [Powder coating materials, powder coatings for industrial applications], January 2000, or in the German patent DE 196 32 426 C2.

Additional binders suitable for the dual-cure powder slurries (A) and. (B) or as the sole binders for the powder slurries (A) and (B) which are curable with actinic radiation are the binders envisaged for use in UV-curable clearcoat materials and powder clearcoat materials, said binders being described in the European patent applications EP 0 928 800 A1, EP 0 636 669 A1, EP 0 410 242 A1, EP 0 783 534 A1, EP 0 650 978 A1, EP 0 650 979 A1, EP 0 650 985 A1, EP 0 540 884 A1, EP 0 568 967 A1, EP 0 054 505 A1 or EP 0 002 866 A1, in the German patent applications DE 197 09 467 A1, DE 42 03 278 A1, DE 33 16 593 A1, DE 38 36 370 A1, DE 24 36 186 A1 or DE 20 03 579 B1, in the international patent applications WO 97/46549 or WO 99/14254, or in the American patents U.S. Pat. Nos. 5,824, 373 A, 4,675,234 A, 4,634,602 A, 4,424,252 A, 4,208,313 A, 4,163,810 A, 4,129,488 A, 4,064,161 A or 3,974,303 A.

The preparation of the binders has no special features in terms of its methodology but instead takes place with the aid of the customary and known methods of polymer chemistry, as described in detail, for example, in the patents set out above.

Further examples of suitable preparation processes for (meth)acrylate copolymers are described in the European patent application EP 0 767 185 A1, in the German patents DE 22 14 650 B1 or DE 27 49 576 B1 and in the American patents U.S. Pat. Nos. 4,091,048 A1, 3,781,379 A, 5,480,493 A, or U.S. Pat. No. 5,534,598 A, or in the standard work Houben-Weyl, Methoden der organischen Chemie, 4$^{th}$ edition, Volume 14/1, pages 24 to 255, 1961. Suitable reactors for the copolymerization include the customary and known stirred vessels, cascades of stirred vessels, tube reactors, loop reactors or Taylor reactors, as described, for example, in the patent applications DE 1 071 241 B1, EP 0 498 583 A1 or DE 198 28 742 A1 or in the article by K. Kataoka in Chemical Engineering Science, Volume 50, No. 9, 1995, pages 1409 to 1416.

The preparation of polyesters and alkyd resins is also described, for example, in the standard work Ullmanns Encyklopädie der technischen Chemie, 3rd edition, Volume 14, Urban & Schwarzenberg, Munich, Berlin, 1963, pages 80 to 89 and pages 99 to 105, and also in the following books: "Résines Alkydes-Polyesters" by J. Bourry, Paris, Dunod, 1952, "Alkyd Resins" by C. R. Martens, Reinhold Publishing Corporation, N.Y., 1961, and also "Alkyd Resin Technology" by T. C. Patton, Interscience Publishers, 1962.

The preparation of polyurethanes and/or acrylated polyurethanes is further described, for example, in the patent applications EP 0 708 788 A1, DE 44 01 544 A1 or DE 195 34 361 A1.

The binder content of the powder slurry (A) of the invention, of the color and/or effect powder slurry (B) and of the clearcoat powder slurry (B) may vary very widely and is guided in particular by whether they are thermally self-crosslinking. In this case, said content may be preferably from 20 to 99.5, more preferably from 25 to 99.2, with particular preference from 30 to 99, with very particular preference from 35 to 98.8, and in particular from 40 to 98.7% by weight, based on the solids of the powder slurry (A) or (B). In the other cases, the binder content is preferably from 10 to 80, more preferably from 15 to 75, with particular. preference from 20 to 70, with very particular preference from 25 to 65, and in particular from 30 to 60% by weight, based on the solids of the powder slurry (A) or (B).

The externally crosslinking powder slurries (A) and (B) which are curable thermally or thermally and with actinic radiation comprise at least one crosslinking agent which contains the reactive functional groups which are complementary to the reactive functional groups of the binders. Consequently, the skilled worker is easily able to select the crosslinking agents suitable for a given powder slurry (A) of the invention, color and/or effect powder slurry (B) and clearcoat powder slurry (B).

Examples of suitable crosslinking agents are amino resins, as described for example in Römpp, op. cit., page 29, "Amino resins", in the textbook "Lackadditive" [Additives for coatings] by Johan Bieleman, Wiley-VCH, Weinheim, N.Y., 1998, pages 242 ff., in the book "Paints, Coatings and Solvents", second, completely revised edition, edited by D. Stoye and W. Freitag, Wiley-VCH, Weinheim, N.Y., 1998, pages 80 ff., in the patents U.S. Pat. No. 4,710,542 A or EP 0 245 700 A1, and in the article by B. Singh and coworkers, "Carbamylmethylated Melamines, Novel Crosslinkers for the Coatings Industry", in Advanced Organic Coatings Science and Technology Series, 1991, Volume 13, pages 193 to 207;

carboxyl-containing compounds or resins, as described for example in the patent DE 196 52 813 A1 or 198 41 408 A1, especially 1,10-decanedicarboxylic acid;

resins or compounds containing epoxy groups, as described for example in the patents EP 0 299 420 A1, DE 22 14 650 B1, DE 27 49 576 B1, U.S. Pat. Nos. 4,091,048 A or 3,781,379 A;

blocked polyisocyanates, as described for example in the patents U.S. Pat. No. 4,444,954 A1, DE 196 17 086 A1, DE 196 31 269 A1, EP 0 004 571 A1 or EP 0 582 051 A1;

beta-hydroxyalkylamides such as N,N,N', N'-tetrakis(2-hydroxyethyl)adipamide or N,N,N',N'-tetrakis(2-hydroxypropyl)adipamide;

tris(alkoxycarbonylamino)triazines, as described in the patents U.S. Pat. Nos. 4,939,213 A1, 5,084,541 A, 5,288,865 A or EP 0 604 922 A1; and/or phenolic curing agents, as described for example in the German patent DE 196 32 426 C2, page 5 line 48 to page 6 line 64.

The amounts of the crosslinking agents in the powder slurry (A) of the invention, in the color and/or effect powder slurry (B) and in the clearcoat powder slurry (B) may likewise vary very widely and is guided by the requirements of the individual case, in particular by the number of complementary reactive functional groups present in the binders and the crosslinking agents. The amount is preferably from 1 to 50, more preferably from 2 to 45, with particular preference from 3 to 40, with very particular preference from 4 to 35, and in particular from 5 to 30% by weight, based on the solids of the powder slurry (A) or (B).

In addition to the pigments, binders and, if appropriate, crosslinking agents described above, the powder slurry (A) of the invention, the color and/or effect powder slurry (B) and the clearcoat powder slurry (B) may further comprise at least one additive. Depending on its physicochemical properties and/or its function, said additive may be present substantially in the dispersed powder coating particles or substantially in the continuous phase.

Examples of suitable additives are thermally curable reactive diluents such as positionally isomeric diethyloctanediols or hydroxyl-containing hyperbranched compounds or dendrimers;

reactive diluents curable with actinic radiation, such as those described in Römpp, op. cit., on page 491 under the heading "Reactive diluents";

crosslinking catalysts such as dibutyltin dilaurate, lithium decanoate or zinc octoate, amine-blocked organic sulfonic acids, quaternary ammonium compounds, amines, imidazole and its derivatives such as 2-styrylimidazole, 1-benzyl-2-methylimidazole, 2-methylimidazole and 2-butyl-imidazole, as described in the Belgian patent numbered 756,693, or phosphonium catalysts such as ethyltriphenylphosphonium iodide, ethyltriphenyl-phosphonium chloride, ethyltriphenylphosphonium thiocyanate, ethyltriphenylphosphonium acetate -acetic acid complex, tetrabutylphosphonium iodide, tetrabutylphosphonium bromide and tetrabutyl-phosphonium acetate-acetic acid complex, as described for example in the U.S. Pat. Nos. 3,477,990 A or 3,341,580 A;

thermally labile free-radical initiators such as organic peroxides, organic azo compounds or C—C-cleaving initiators, such as dialkyl peroxides, peroxocarboxylic acids, peroxodicarbdnates, peroxide esters, hydroperoxides, ketone peroxides, azo dinitriles or benzpinacol silyl ethers;

photoinitiators, as described in Römpp Chemie Lexikon, $9^{th}$, revised and expanded edition, Georg Thieme Verlag, Stuttgart, Vol. 4, 1991, or in Römpp, op. cit., pages 444 to 446;

antioxidants such as hydrazines and phosphorus compounds;

UV absorbers such as triazines, benzotriazoles or oxalanilides;

light stabilizers such as HALS compounds;

leveling agents;

free-radical scavengers and polymerization inhibitors such as organic phosphites or 2,6-di-tert-butylphenol derivatives;

slip additives;

defoamers;

emulsifiers, especially nonionic emulsifiers such as alkoxylated alkanols and polyols, phenols and alkylphenols, or anionic emulsifiers such as alkali metal salts and ammonium salts of alkanecarboxylic acids, alkanesulfonic acids, and sulfo acids of alkoxylated alkanols and polyols, phenols and alkylphenols;

wetting agents such as siloxanes, fluorine compounds, carboxylic monoesters, phosphoric esters, polyacrylic acids and their copolymers, or polyurethanes, as described for example in the patent application DE 198 35 296 A1, especially in conjunction with the polyurethane-based associative thickeners described below;

adhesion promoters such as tricyclo-decanedimethanol;

film formation auxiliaries such as cellulose derivatives;

flame retardants;

devolatilizers such as diazadicycloundecane or benzoin;

water retention agents;

rheology control additives (thickeners), such as those known from the patent applications WO 94/22968, EP 0 276 501 A1, EP 0 249 201 A1 or WO 97/12945; crosslinked polymeric microparticles, such as those disclosed, for example, in EP 0 008 127 A1; inorganic phyllosilicates such as aluminum magnesium silicates, sodium magnesium phyllosilicates and sodium magnesium fluorine lithium phyllosilicates of the montmorillonite type; silicas such as Aerosils; or synthetic polymers containing ionic and/or associative groups, such as polyvinyl alcohol, poly(meth)-acrylamide, poly(meth)acrylic acid, polyvinyl-pyrrolidone, styrene-maleic anhydride or ethylene-maleic anhydride copolymers and their derivatives, or polyacrylates; or polyurethane-based associative thickeners, as described in Römpp, op. cit., "Thickeners", pages 599 to 600, and in the textbook "Lackadditive" by Johan Bieleman, Wiley-VCH, Weinheim, N.Y., 1998, pages 51 to 59 and 65; in particular, combinations of ionic and nonionic thickeners,. as described in the patent application DE 198 41 842 A1 for establishing pseudoplasticity, or the combination of polyurethane-based associative thickeners and polyurethane-based wetting agents, as is described in the German patent application DE 198 35 296 A1 in detail.

Further examples of suitable additives are described in the textbook "Lackadditive" by Johan Bieleman, Wiley-VCH; Weinheim, N.Y., 1998. They are employed in the customary and known amounts.

The preparation of the color and/or effect powder slurry (B) and the clearcoat powder slurry (B) for use in accordance with the invention from the constituents described above likewise has no special features but instead takes place substantially as described in detail in the patent applications DE 195 40 977 A1, DE 195 18 392 A1, DE 196 17 086 A1, DE-A-196 13 547, DE 196 18 657 A1, DE 196 52 813 A1, DE 196 17 086 A1, DE 198 14 471 A1, DE 198 41 842 A1 or DE 198 41 408 A1, except that, for the preparation of the color and/or effect powder slurry (B), pigments are included in the processing operation.

In a first preferred variant of the preparation, the starting material is a color and/or effect powder coating material or powder clearcoat material, which is prepared as described in the product information bulletin from BASF Lacke+Farben AG, AG, "Pulverlacke", 1990 or in the BASF Coatings AG brochure "Pulverlacke, Pulverlacke für industrielle Anwendungen", January 2000, by homogenization and dispersion, using for example an extruder or screw kneading apparatus, and grinding. After the powder coating materials have been prepared, they are made ready for dispersion by further grinding and, if appropriate, by classifying and sieving.

The color and/or effect powder slurry (B) and the clearcoat powder slurry (B) may then be prepared from the powder coating materials by wet grinding or by stirred incorporation of the dry-ground powder coating material. Particular preference is given to wet grinding.

In a further preferred variant, the constituents described above are emulsified in an organic solvent, to give an emulsion of the oil-in-water type, after which the organic solvent is removed, as a result of which the emulsified droplets solidify to give the color and/or effect powder slurry (B) or the clearcoat powder slurry (B) for use in accordance with the invention. If desired, the slurries may also be subjected to wet grinding in order to improve the filterability.

In a third preferred variant, a liquid melt of the constituents described above, alone or together with the unmelted pigments, is introduced into an emulsifying apparatus, preferably with the addition of water and stabilizers, and the resulting emulsion is cooled and filtered, giving. the clearcoat powder slurry (B) and color and/or effect powder slurry (B) for use in accordance with the invention. In order to achieve a high quality of mixing, it is important to carry out mixing in the melt without solvent. Accordingly, the polymeric constituents are fed into the dispersing apparatus in the form of viscous resin melts.

The color and/or effect powder slurry (B) for use in accordance with the invention and the clearcoat powder slurry (B) for use in accordance with the invention are used to prepare the powder slurry (A) of the invention by the process of the invention. For this purpose, the color and/or effect powder slurry (B), especially the color powder slurry (B), or the clearcoat powder slurry (B) is mixed with at least one tinting paste (C). The mixing ratio may vary very widely and is guided by the requirements of the individual case, especially by the target shade and its intensity. Preferably, the weight ratio of powder slurry (B) to tinting paste (C), i.e., (B):(C), is from 1000:1 to 10:1, more preferably from 500:1 to 11:1, with particular preference from 200:1 to 12:1, and in particular from 100:1 to 13:1.

The material composition of the tinting pastes (C) may likewise vary widely. It is important that they are compatible with the color and/or effect powder slurry (B) and the clearcoat powder slurry (B), so that there are no instances of gloss haze in the coatings, and no exudation or floating of constituents of the tinting pastes (C) from the coatings which have been produced from the powder slurry (A) of the invention.

Preference is given to the use of aqueous tinting pastes (C). The tinting pastes may include minor amounts of organic solvents typical of coating materials, minor amounts being understood to be those amounts which do not destroy the aqueous nature of the tinting pastes (C). Examples of suitable organic solvents are alkylene glycols such as propylene glycol.

The aqueous tinting pastes (C) comprise at least one of the color and/or effect pigments described above. The pigment content may vary very widely and is guided on the one hand by their physical properties, such as dispersibility and hiding power. Preferably, the pigments are used in an amount of 10 to 80, more preferably from 12 to 75, with particular preference from 14 to 70, and in particular from 16 to 65% by weight, based in each case on the tinting paste (C).

In order to obtain effective distribution of the pigments in the aqueous tinting pastes (C), these pastes include at least one wetting agent and/or one emulsifier. Suitable wetting agents and emulsifiers are those described above.

The aqueous tinting pastes (C) preferably include at least one, especially one, customary and known, water-dilutable (meth)acrylate copolymer and/or one phyllosilicate-based and/or polyurethane-based thickener.

Suitable thickeners are those described above.

Examples of suitable (meth)acrylate copolymers are those described in the German patent application DE 198 55 146 A1.

Furthermore, the aqueous tinting pastes (C) may comprise at least one of the additives described above.

The preparation of the tinting pastes (C) for use in accordance with the invention presents no special features in terms of its methodology but instead takes place in accordance with the customary and known methods of preparing tinting pastes by mixing their constituents is suitable mixing equipment such as stirred vessels, dissolvers, Ultraturrax or extruders. Preferably, the desired fineness of the pigments is brought about by grinding the tinting paste (C) in, for example, a mill incorporating a stirrer mechanism.

The mixing of the tinting pastes (C) with the color and/or, effect powder slurries (B) for use in accordance with the invention or the clearcoat powder slurries (B) also presents no special features in terms of its methodology but instead takes place in accordance with the processes described above, using the mixing equipment described above. Mixing may also take place, however, by hand, especially when preparing very small amounts.

For the tinting process of the invention in which the tinting pastes (C) are mixed with the powder slurries (A) of the invention, the comments made above apply mutatis mutandis.

By virtue of the preparation process of the invention and the tinting process of the invention, it is possible from the outset or subsequently to carry out particularly precise adjustment of the shades and/or optical effects of the powder slurries (A) of the invention, without great effort. As a result it is possible in a simple manner to prepare powder slurries (A) of the invention in any of a very wide variety of hues and/or optical effect intensities, as and when required, and in the particular amounts required. Accordingly, it is also possible to dispense with the preparation of large amounts of powder slurries (A) of the invention having particular shades and/or optical effects, as a result of which the disposal problems are reduced or even done away with entirely.

Another advantage of the preparation process and tinting process of the invention is that, in addition, excess color and/or effect powder slurries and powder clearcoat materials or off-specification batches, which to date have no longer been suitable for use, may now still be used for the preparation of the powder slurries (A) of the invention and need not be disposed of.

It is a very significant advantage of the powder slurry (A) of the invention and of the preparation process and tinting process of the invention that said slurry may be prepared and, respectively, said processes carried out with the aid of a mixer system.

The mixer system of the invention comprises at least one, especially one, color and/or effect powder slurry (B) and/or at least one, especially one, clearcoat powder slurry (B). It is preferred to use a clearcoat powder slurry (B) or a color powder slurry (B) which preferably has a pale shade, especially an. achromatic shade. Particular preference is given to the use of a white powder slurry (B).

The mixer system of the invention further comprises at least two tinting pastes (C) which are compatible in the sense described above with the color and/or effect powder slurry (B) and the clearcoat powder slurry (B), and with one another.

The basic principle of the mixer system of the invention is that a very large number—several thousand, for example—of powder slurries (A) of the invention having different shades and/or optical effects may be prepared with a limited number of color and/or effect powder slurries (B) or clearcoat powder slurries (B) on the one hand and tinting pastes (C) on the other hand. Surprisingly, one clearcoat powder slurry (B) or from 1 to 10 different color and/or effect powder slurries (B) and from 10 to 50 different tinting pastes (C) are sufficient to provide, for example, as good as all of the shades and/or optical effects which are customary in automotive OEM finishing or automotive refinishing.

The mixer system of the invention is preferably configured and employed in the form of a modular system in which the modules are standardized, ready-to-use products whose performance properties profiles are precisely adapted to one another and complement one another.

The modular system of the invention comprises a powder slurry module (I) comprising at least one of the above-described color and/or effect powder slurries (B) and/or at least one of the above-described clearcoat powder slurries (B). The modular system of the invention further comprises at least two different tinting modules (II), each comprising a tinting paste (C).

An essential functional component (III) of the modular system of the invention is the paint mixing formula system. This system is elaborated on the basis of the differently color- and/or effect-imparting powder slurries (A) and/or (B) of the invention or of the clearcoat powder slurries (B) and also of the differently color- and/or effect-imparting tinting pastes (C) and is documented in the form of formulas and of standardized samples of the coatings produced from the individual powder slurries (A) of the invention.

The powder slurries (A) of the invention, especially those prepared by the preparation process of the invention, subsequently adjusted by the tinting process of the invention and/or prepared or tinted with the aid of the mixer system or modular system of the invention, are outstandingly suitable for all end uses for which color and/or effect powder slurries are commonly used. They are suitable in particular for automotive OEM finishing, automotive refinishing, the interior and exterior coating of constructions, the coating of doors, windows and furniture, and also for industrial coating, including coil coating, container coating, and the impregnation and/or coating of electrical components.

In this context, they are particularly suitable for producing color and/or effect primers, primer-surfacers, solid-color and/or effect topcoats or basecoats, or combination effect coats, which are able to take on two or more of these functions, for the primed and unprimed substrates as commonly used in the abovementioned technical fields.

They may be applied without problems. The applied layers exhibit excellent leveling. The layers may be cured using all customary and known equipment and techniques of thermal curing and/or curing with actinic radiation. The resultant coatings have brilliant colors and/or intense optical effects and are free from surface defects and gloss haze. They show no evidence of floating or exudation of constituents.

EXAMPLES

Preparation Examples 1 to 4

The Preparation of Aqueous Tinting Pastes (C)

Preparation Example 1

Black Tinting Paste

A black tinting paste was prepared by mixing the following constituents in the stated order:

10.0 parts by weight of a commercial phyllosilicate based on, an organically modified smectite (Bentone® EW paste, 10 percent, from Rheox, Belgium),
10.0 parts by weight of a commercial wetting agent (alkylphenol ethoxylate, Lutensol® AP 9, BASF AG),
5.8 parts by weight of a commercial emulsifier (Pigmentverteiler MD 20, BASF AG),
3.5 parts by weight of deionized water,
15.1 parts by weight of propylene glycol,
0.1 part by weight of a commercial solution of an isothiazolinone derivative (Euxyl® K 100, Schülke & Mayr, Norderstedt),
0.5 part by weight of a commercial thickener (mixture of liquid hydrocarbons with hydrophobic silica, a monohydric alcohol and emulsifiers, Agitan® 703 N, Münzing Chemie, Heilbronn), and 55.0 parts by weight of Sicomix® black 00-6060 (mixture of-lampblack and barium sulfate, BASF AG).

Preparation Example 2

Blue Tinting Paste

A blue tinting paste was prepared by mixing the following constituents in the stated order:
15.0 parts by weight of a water-dilutable methacrylate copolymer (Parocryl® AW 51.6, BASF Coatings AG),
21.4 parts by weight of deionized water,
13.0 parts by weight of a commercial wetting agent (Disperse-Ayd® W 22, 35 percent strength in water/propylene glycol,. Krahn Chemie),
5.0 parts by weight of soya lecithin (Hanf und Nelles, Düsseldorf),
2.0 parts by weight of deionized water,
0.5 part by weight of a commercial additive (Agitan® E 256, aqueous emulsion of organically modified polysiloxanes, Münzing Chemie, Heilbronn),
5.0 parts by weight of propylene glycol,
0.1 part by weight of a commercial solution of an isothiazolinone derivative (Euxyl® K 100, Schülke & Mayr, Norderstedt), and
38.0 parts by weight of Heliogen-Blau L 7101 F (copper phthalocyanine, BASF AG).

Preparation Example 3

Orange-colored Tinting Paste

The orange-colored tinting paste was prepared by mixing the following constituents in the stated order:
20.0 parts by weight of a water-dilutable methacrylate copolymer (Parocryl® AW 51.6, BASF Coatings AG),
26.8 parts by weight-of deionized water,
13.0 parts by weight of a commercial wetting agent (Disperse-Ayd® W 22, 35 percent strength in water/propylene glycol, Krahn Chemie),
2.0 parts by weight of commercial emulsifier (Pigmentverteiler MD 20, BASF AG),.
2.1 parts by weight of deionized water,
1.0 part by weight of a commercial additive (Agitan® E 256, aqueous emulsion of organically modified polysiloxanes, Münzing Chemie, Heilbronn),
5.0 parts by weight of propylene glycol,
0.1 part by weight of a commercial solution of an isothiazolinone derivative (Euxyl® K 100, Schülke & Mayr, Norderstedt), and
30.0 parts by weight of Paliotol-Orange L 2930 HD (azo pigment, BASF AG).

Preparation Example 4

Yellow Tinting Paste

The yellow tinting paste was prepared by mixing the following constituents in the stated order:
22.0 parts by weight of a water-dilutable methacrylate copolymer (Parocryl® AW 51.6, BASF Coatings AG),
19.3 parts by weight of deionized water,
13.0 parts by weight of a commercial wetting agent (Disperse-Ayd® W 22, 35 percent strength in water/propylene glycol, Krahn Chemie),
2.1 parts by weight of a commercial emulsifier (Pigmentverteiler MD 20, BASF AG),
1.0 part by weight of a commercial additive (Agitan® E 256, aqueous emulsion of organically modified polysiloxanes, Münzing Chemie, Heilbronn),
5.0 parts by weight of propylene glycol,
0.1 part by weight of a commercial solution of an isothiazolinone derivative (Euxyl®D K 100, Schülke & Mayr, Norderstedt),
0.5 part by weight of a commercial thickener (Borchigel® L 75 N, 54 percent strength in water, nonionic, polyurethane-based thickener), and
37.0 parts by weight of Sico-Gelb L 1252 HD (azo pigment, BASF AG).

Preparation Example 5

The Preparation of a Clearcoat Powder Slurry (B)

For Examples 1 to 3, a clearcoat powder slurry (B) was prepared. For this purpose, a powder coating material was first prepared from 46.9 parts by weight of a solid epoxy resin (DOW® E.R. 642 U-20, 100%, from Dow, Schwalbach) and 20.85 parts by weight of a phenolic curing agent prepared from an epoxy resin and an excess of bisphenol, A (DOW® E.H.82, 100%, from Dow, Schwalbach) by extruding the constituents and grinding the resulting mixture.

The clearcoat powder slurry (B) was prepared from the following constituents by mixing:
62.48 parts by weight of deionized water,
0.5 part by weight of Acrysol® RM-8 (nonionic thickener based on a water-soluble polyurethane, from Rohm and Haas; 35 percent strength),
1.0 part by weight of Disperse Ayd® W-22 (anionic/nonionic wetting agent from Krahn Chemie, Hamburg; 35 percent strength in water/propylene glycol),
0.02 part by weight of Triton® X 100 (nonionic surfactant, octylphenoxypolyethoxyethanol from Union Carbide),
36.0 parts by weight of the powder clearcoat material, and
0.05 part by weight of Byk® 345 (polyether-modified polydimethylsiloxane from Byk Chemie).

Preparation Example 6

The Preparation of a White Powder Slurry (B)

For Examples 4 to 8, a white powder slurry (B) was prepared. For this purpose, a white powder coating material was first prepared from 46.9 parts by weight of a solid epoxy resin (DOW® E.R. 642 U-20, 100%, from Dow, Schwalbach), 20.85 parts by weight of a phenolic curing agent prepared from an epoxy resin and an excess of bisphenol A (DOW® E.H.82, 100%, from Dow, Schwalbach) and 31.25 parts by weight of Titan Rutil 2310 (commercial titanium dioxide pigment from Kronos International) by extruding the constituents and grinding the resulting mixture.

The white powder slurry (B) was prepared from the following constituents by mixing:
62.48 parts by weight of deionized water,
0.5 part by weight of Acrysol® RM-8 (nonionic thickener based on a water-soluble polyurethane, from Rohm and Haas; 35 percent strength),
1.0 part by weight of Disperse Ayd® W-22 (anionic/nonionic wetting agent from Krahn Chemie, Hamburg; 35 percent strength in water/propylene glycol),
0.02 part by weight of Triton®x100 (nonionic surfactant, octylphenoxypolyethoxyethanol from Union Carbide),
36.0 parts by weight of the white powder coating material, and 0.05 part by weight of Byk® 345 (polyether-modified polydimethylsiloxane from Byk Chemie).

Examples 1 to 8

The Preparation of Inventive Powder Slurries (A)

The inventive powder slurries (A) of Examples 1 to 8 were prepared by mixing the clear or color powder slurries (B) specified in connection with the individual examples, and the appropriate tinting pastes (C).

Example 1

Black Powder Slurry (A)
95.9 parts by weight of the clearcoat powder slurry (B) from Preparation Example 5 and
4.1 parts by weight of the black tinting paste (C) from Preparation Example 1

Example 2

Yellow Powder Slurry (A)
95.0 parts by weight of the clearcoat powder slurry (B) from Preparation Example 5,
4.7 parts by weight of the yellow tinting paste (C) from Preparation Example 4, and
0.3 part by weight of the black tinting paste (C) from Preparation Example 1

Example 3

Orange-colored Powder Slurry (A)
94.8 parts by weight-of the clearcoat powder slurry (B) from Preparation Example 5 and
5.2 parts by weight of the orange-colored tinting paste (C) from Preparation Example 2.

Example 4

Beige-colored Powder Slurry (A)
97.5 parts by weight of the white powder slurry (B) from Preparation Example 6,
2.0 parts by weight of the yellow tinting paste (C) from Preparation Example 4, and
0.5 part by weight of the black tinting paste (C) from Preparation Example 1

Example 5

Pale Beige Powder Slurry (A)
97.1 parts by weight of the white powder slurry (B) from Preparation Example 6,
2.7 parts by weight of the yellow tinting paste (C) from Preparation Example 4, and
0.2 part by weight of the black tinting paste (C) from Preparation Example 1

Example 6

Bright Yellow Powder Slurry (A)
94.1 parts by weight of the white powder slurry (B) from Preparation Example 6,
5.5 parts by weight of the yellow tinting paste (C) from Preparation Example 4, and
0.4 part by weight of the orange-colored tinting paste (C) from Preparation Example 3

Example 7

Bright Blue Powder Slurry (A)
97.1 parts by weight of the white powder slurry (B) from Preparation Example 6,
2.7 parts by weight of the blue tinting paste (C) from Preparation Example 2, and
0.2 part by weight of the black tinting paste (C) from Preparation Example 1

Example 8

Pale Gray Powder Slurry (A)
98.2 parts by weight of the white powder slurry (B) from Preparation Example 6 and
1.8 parts by weight of the black tinting paste (C) from Preparation Example 1

The inventive powder slurries (A) of Examples 1 to 8 were stable on storage and showed no sedimentation of solid particles or floating of other constituents. The inventive powder slurries (A) were applied to steel panels which had been coated with a customary and known electrodeposition coating. The flowout of the resulting powder slurry layers was outstanding. Baking resulted in black, yellow, orange-colored, beige, pale beige, bright yellow, bright blue and pale gray coatings which were in accordance with the preset specifications, were free from surface defects and gloss haze, and showed no signs of floating or exudation of constituents. The reproducibility of the shades was outstanding.

What is claimed is:

1. A process for preparing powder slurry of a particular shade, which comprises
   mixing a powder slurry or slurries selected from the group consisting of color powder slurries of achromatic shade and clearcoat powder slurries with at least one aqueous, color- or effect-imparting tinting paste, said tinting paste comprising at least one pigment selected from the group consisting of color pigments and effect pigments, a water-dilutable (meth)acrylate copolymer, a minor amount of an alkylene glycol, and at least one member selected from the group consisting of phyllosilicate-based thickeners and polyurethane-based thickeners, to give the powder slurry of the particular shade.

2. The process as claimed in claim 1, wherein the tinting paste comprises at least one member selected from the group consisting of wetting agents and emulsifiers.

3. The process as claimed in claim 1, wherein the powder slurry or slurries selected from the group consisting of color powder slurries of achromatic shade and clearcoat powder slurries and the tinting paste or tinting pastes are mixed with one another in a weight ratio of from 1000:1 to 10:1.

4. A method of coating a substrate, comprising steps of
   preparing a powder slurry according to the process as claimed in claim 1 and
   applying the powder slurry to a substrate selected from the group consisting of automotive substrates, the interiors and exteriors of constructions, doors, windows and furniture, industrial substrates, coils, containers, and electrical components.

5. A mixer system for preparing a powder slurry with at least one characteristic selected from the group consisting of shade, optical effects and mixtures thereof of a powder slurry, comprising
- (I) at least one powder slurry selected from the group consisting of color powder slurries of achromatic shade and clearcoat powder slurries and mixtures thereof,
- (II) at least two differently-colored tinting pastes compatible with the powder slurry and with one another, said tinting pastes comprising at least one pigment selected from the group consisting of color pigments and effect pigments, a water-dilutable (meth)acrylate copolymer, a minor amount of an alkylene glycol, and at least one member selected from the group consisting of phyllosilicate-based thickeners and polyurethane-based thickeners, and
- (Ill) a paint mixing formula system for preparing at least one of the shade and optical effects of the powder slurry using the at least one powder slurry and at least two tinting pastes.

6. The mixer system as claimed in claim 5, wherein the tinting pastes each individually comprises at least one member selected from the group consisting of wetting agents and emulsifiers.

7. The mixer system as claimed in claim 5, wherein in which the powder slurry or slurries of (I) and the tinting pastes of (II) are standardized, ready-to-use products whose performance properties profiles are precisely adapted to one another and complement one another.

* * * * *